W. L. KEITH.
REED HOOK.
APPLICATION FILED APR. 16, 1913.
1,094,855.
Patented Apr. 28, 1914.
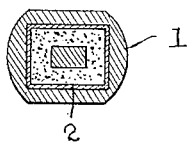
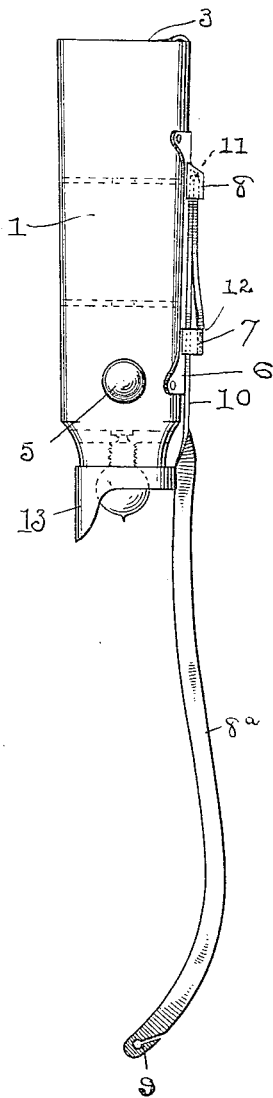
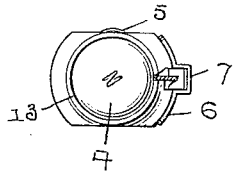

UNITED STATES PATENT OFFICE.

WINFIELD L. KEITH, OF MILLTOWN, MAINE.

REED-HOOK.

1,094,855.  Specification for Design.  Patented Apr. 28, 1914.

Application filed April 16, 1913. Serial No. 761,406.

*To all whom it may concern:*

Be it known that I, WINFIELD L. KEITH, a citizen of the United States, residing at Milltown, in the county of Washington and State of Maine, have invented certain new and useful Improvements in Reed-Hooks; and I do hereby declare the following to be a full, clear, and exact description of the invention, such as will enable others skilled in the art to which it appertains to make and use the same.

This invention relates to a weaver's reed hook and illuminating detachable handle therefor.

The object of the invention is the provision of a reed hook and handle therefor having an electric lamp attached which may be lighted at the will of the operator to illuminate the parts of his work toward which the handle is directed.

A further object is to provide a reed hook having removable connection with a handle, whereby the parts may be readily separated.

In the accompanying drawing, Figure 1 represents a side elevation of my invention complete. Fig. 2 is a sectional view through the handle and one of the batteries therein, and, Fig. 3 is an end view, partly in section, of a hook and handle.

Referring to the drawing, the numeral 1 indicates the handle of my device which may be constructed in any form desired and of any suitable material, such as metal or hard rubber. It is essential, however, that the handle be hollowed so as to receive one or a series of batteries 2, which are preferably of the ordinary dry type. The end 3 of the handle may be either hinged or removable, as desired, so as to permit access to the interior of the handle for replacing the batteries. The opposite end of the handle is provided with a socket to receive a small electric lamp 4, which is adapted to be lighted when the button 5 in the side of the handle 1 is depressed to close the circuit between the batteries and said lamp. A plate 6 is secured to the side of the handle 1 and provided at one end with a strap 7 and at the opposite end with a socket 8. The parts 7 and 8 may be struck out from the plate 6, or formed separately therefrom and secured thereto in any suitable way.

The reed hook is composed of a blade $8^a$ having a slot and eye 9 in its free curved extremity and a shank 10 which is turned a quarter of a revolution with respect to the blade $8^a$ so as to lie flat against the plate 6. The shank is bent upon itself at 11 and the free end turned outwardly and offset, as at 12. The shank 10 is adapted to be inserted beneath the strap 7 and moved longitudinally thereunder until the bent end 11 thereof engages within the socket 8 and the offset end 12 thereof springs into locked position behind the strap 7. A shield and reflector 13 for the lamp 4 is secured to the blade portion $8^a$ of the hook.

From the foregoing it will be seen that I have provided an illuminated reed hook which is extremely simple in construction and readily detachable or attachable to a handle, in which is provided efficient means for illuminating the work of the weaver.

What I claim is:

1. The combination with a handle, and an electric light therein, of a reed hook secured to said handle.

2. The combination with a handle, and an electric light therein, of a reed hook detachably secured to said handle.

3. The combination with a handle, and an electric light therein, of a reed hook secured to said handle, and a shield inclosing said light.

4. The combination with a handle, and an electric light therein, of a reed hook detachably secured to said handle, and a shield carried by said hook and inclosing said light.

5. The combination with a handle, and an electric light therein, of a reed hook secured to said handle and a combined shield and reflector secured to said hook and partially inclosing said light.

In testimony whereof I have signed my name to this specification in the presence of two subscribing witnesses.

WINFIELD L. KEITH.

Witnesses:
 JOHN D. GROVES,
 CHARLES B. MACININCH.

Copies of this patent may be obtained for five cents each, by addressing the "Commissioner of Patents, Washington, D. C."